Oct. 16, 1951     D. S. FERNANDES     2,571,555
APPARATUS FOR TREATING GRAIN
Filed April 22, 1949     2 SHEETS—SHEET 1

INVENTOR.
Daniel Salomon FERNANDES
BY
Attorney

Oct. 16, 1951 D. S. FERNANDES 2,571,555
APPARATUS FOR TREATING GRAIN
Filed April 22, 1949 2 SHEETS—SHEET 2

INVENTOR.
Daniel Salomon FERNANDES
BY
Attorney

Patented Oct. 16, 1951

2,571,555

UNITED STATES PATENT OFFICE 2,571,555

APPARATUS FOR TREATING GRAIN

Daniel Salomon Fernandes, Paramaribo, Surinam, Dutch West Indies, assignor to Vita-Rich Rice Process Ltd., New York, N. Y., a corporation of New York Application April 22, 1949, Serial No. 88,945
In the Netherlands September 9, 1948

7 Claims. (Cl. 99—237)

The invention relates to a new apparatus for treating grain, such as for processing rice to preserve its vitamin contents.

More particularly, the object of the invention is an apparatus for carrying out the method of my copending U. S. patent application Ser. No. 88,946, filed on even date herewith. The said method, as more fully described and claimed in the said patent application, is concerned with the boiling in part, or parboiling, rice in such a manner that the vitamins, originally present in the rough rice—paddy—or rice in the husk and more particularly the vitamins $B_1$, also called thiamine or aneurine, are fully retained, up to 100%, in the white kernels after the husks had been removed and the rice had been polished or even milled.

More specifically, it is an object of the invention to develop an apparatus by means of which the rice may be processed in such a way that the vitamins of the rice kernel, located in the silver coat, the outer cell layers and in the germ are transferred or diffused into the kernel and secured and fixed therein by gelatinization of the starch contained in the kernel.

A further object of the invention is an apparatus by means of which the preserving and fixing of the vitamin contents in the rice kernels may be achieved by a continuous process.

As is known, the production of parboiled rice comprises three stages, the soaking, the steaming, and the drying of the natural or rough rice.

When in the first two phases the rice is treated in closed vessels, it is of course impossible to control the progress of the treatment at arbitrarily selected portions of the material, and when the material is treated in bulk in open or in closed vessels, it is impossible to make the surfaces of the individual grains uniformly accessible to the treatment. Furthermore, in the treatment in closed vessels it is impossible to conform the quantity of moisture with which the material is to be permeated with the quantity of treating fluid supplied to the process. During the wet treatment, it is thus unavoidable that the water is supplied in large excess of the quantity needed. Consequently, water will flow out of the kernels and this back flow of water will cause an essential loss of vitamins. Similarly if the grain or rice is in contact with an excess of condensate in the steaming vessel, a further loss in vitamins may occur likewise through back flow of water out of the kernels. Furthermore, the pressure in the closed steaming vessel will be well above atmospheric pressure and thus the temperature well above the temperature to which the material may be heated without damage to the vitamins.

A further object of the invention, therefore, is an apparatus which makes possible regular and complete supervision of the temperature to which the product is heated during the various stages of the treatment and by means of which the temperature of the process may be maintained easily at the correct values, and perfectly uniform throughout the mass of the rice so as to preserve fully the vitamin contents therein and which at the same time is suitable for economic use as well on a large as on a small production scale.

The apparatus of the invention, moreover, renders needless the otherwise expensive use of high steam pressure on the one hand, and, on the other hand, of vacuum or both.

A further object of the invention is an apparatus into which the grain or rice may be fed without any risk that the kernels be crushed or broken by the feeding device and from which apparatus the processed material is discharged in perfect physical condition with the grains unbroken.

The apparatus of the invention therefore makes possible full supervision of the process at atmospheric conditions not only in the drying station but also in the stations for wet treatment and steaming.

The apparatus for all the three stations comprises in its essential features a cylindrical revolving drum with helical conveyer blades secured to the inner wall of the drum with a particular charging or feeding device at its one end.

The drums, not only that for the drying station but also those for the wet treatment and steaming stations, are open to the atmosphere at their discharge ends and thus are under atmospheric pressure.

A stationary foraminated central tube for the admittance of the treating medium is disposed within the drum and along the longitudinal axis thereof. A helical conveyer blade, secured with its outer margin to the inner wall of the drum is disposed within the drum and extended the length thereof including one of said end pieces. The inner margin of the conveyer blade ends with clearance off the foraminated central tube.

The invention has furthermore as its object the provision of these drums with a feeding device which makes possible the feeding of the grain or rice into the drums without any risk that the individual grains might inadvertently be hit by rotating edges of the apparatus and thus might be crushed, broken or otherwise be damaged.

The apparatus of the invention thus is provided with a feeding device which comprises an end piece of the drum in form of a hollow truncated cone secured to the feeding end of the rotating drum. A stationary hollow cone is provided and disposed so as to extend with its axis horizontally and engage with its base portion the truncated cone from the inside. A hopper is mounted on and opens into the top portion of the horizontal cone at a distance from its axis. The stationary foraminated central tube is passed closely fitting through the top of the horizontal cone. From the top part of the horizontal cone, there is thus introduced into the drum the grain directly and the treating fluids, water, steam, or a mixture of both, and air, through the central tube. The horizontal cone protects the grain or rice supplied to the drum against damage through the revolving edge of the drum whereas concomitantly the feeding end of the drum is securely closed against any scattering or other loss of the grain or rice.

The material is thus conveyed through, and subjected to the action of the treating medium, the kernels being loosely assembled in a thin layer to be finally discharged at the end of the revolving drum.

The medium to be admitted to the drum for soaking the rice or grain will be water, the temperature of which may be regulated by the simultaneous admittance of steam or by controlling the temperature of the water supply such as a hot-water tank. Conversely, for the steaming of the rice, the treating medium admitted through the central tube to the drum will be dry or moist steam. At the station for drying the rice or grain, the treating medium supplied through the central tube to the drum will be heated air.

Further objects and features of the invention will in part become obvious and will in part appear hereinafter as the specification proceeds.

An embodiment of an apparatus of the invention will now be described with reference to the accompanying drawings which are to be understood explicative of the invention but not limitative of its scope. Other embodiments incorporating the principles underlying my invention are feasible without departing from the spirit and ambit thereof.

In the drawings:

Fig. 4 is a similar view of a modification of the end portion of the apparatus of Fig. 1; whereas

Figure 1:
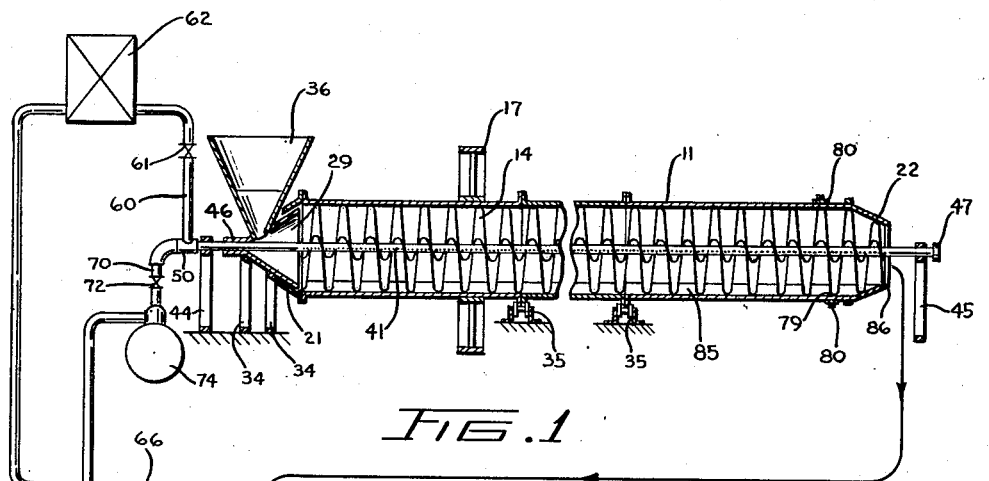
Fig. 1 is a more or less diagrammatic longitudinal section through an apparatus for soaking the rough rice, as the first station for the treatment of the rice.

The three stations for carrying out the process comprise apparatus similar to one another. Each includes a horizontal rotatable drum 11, 12, and 13, respectively, to the walls of which there are fixed, by welding or any other suitable means, helical conveyer members or blades 14, 15, and 16, respectively.

The walls of the drums 11 and 12 are impermeate whereas the wall of drum 13 is foraminated or perforated over its whole length, such perforations having the form of small, circumferentially directed slots of say 1 mm. length and 2 mm. wide. These openings or slots may easily be freed from kernels which may have stuck therein, by means of a brush (not shown) contacting the outer surface of the rotating drum.

A pulley 17, 18, 19, respectively, or other convenient or conventional driving element is provided at each of the drums, driven by a belt, or other drive, not shown, for rotating the drums about their axes.

The cylindrical drums, 11, 12, 13, are provided at both their charging and discharging ends with conical end pieces, 21, 22; 23, 24; and 25, 26, respectively, open at both their bases.

The conical end pieces 21, 23, and 25 embrace, and thus are rotatably supported by, hollow sheet metal cones 29, 30, and 31, respectively. These cones 29, 30, and 31 are longer than and project over the cones 21, 23, and 25 and are supported at their projecting tops by supports 34. Rollers 35 support the drums 11, 12, 13 rotatably. The supporting cones 29, 30, 31 further carry the feeding hoppers 36, 37, 38, respectively, mounted on and opening into the tops of cones 29, 30, 31, respectively, at a distance from the axes thereof sufficient to allow for the passage of the stationary central tubes 41, 42, 43, through the tops of the horizontal cones 29, 30, 31, respectively, which tubes thus extend along the common axes of the horizontal cones, the truncated conical end pieces 21, 23, 25, and the drums 11, 12, 13, respectively.

Figure 2:
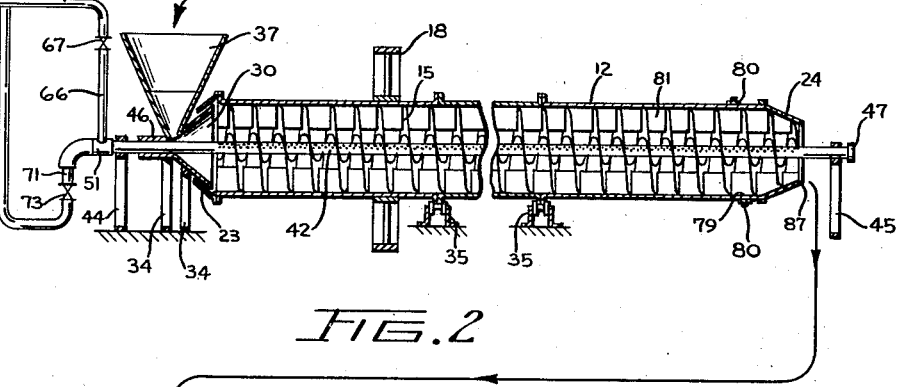
Fig. 2 illustrates as the second station, likewise in a diagrammatic longitudinal section, an apparatus for the steaming of the soaked rough rice.

Stationary central tubes 41, 42, 43, respectively, are disposed within the drums 11, 12, 13 and along the longitudinal axes thereof. The tubes are supported at both their ends by supports 44 and 45. Inside the drums, the tubes are foraminated as illustrated in the drawings i. e. the tube 41 of the apparatus for soaking the rough rice is perforated at the lower side only, whereas the tube 42 (Fig. 2) of the apparatus for steaming the soaked rice has its perforations restricted to the upper portion. The drums, tubes and other parts may be of iron, or any other suitable metal or material.

The central tubes 41, 42, and 43 enter their respective drums 11, 12, and 13 through a neck 46 at the one end, the feeding end, and are closed at the other end, the discharge end, by a cap 47, for instance.

A feed line 60 with control valve 61 connects the open end 58 of tube 41 to a water supply line, a water tank 62, or other source of water supply. Similarly, a feed line 66, with control valve 67, supplies water from the same source 62, or another source of water supply, to the open end 51 of tube 42. Furthermore, steam is supplied, from a boiler 74 or other source of steam supply, to tubes 41 and 42 through feed lines 70 and 71 with control valves 72 and 73, respectively.

Tube 43 of drum 13 is connected at its open end 52 to a fan 76, or other source of heated air under pressure and at a controllable temperature. Assuming otherwise equal dimensions of the three drums, for instance diameter 40 cm., length 800 cm., tube 42 will be of slightly larger diameter than tube 41, whilst tube 43 will be of still larger diameter, 10 cm. for instance.

The drums may be provided with draining openings 79 distributed over the circumference of the drums, such as indicated in the drawings. These openings are normally closed by a plug 80.

In the drums 12, 13, i. e. those within which the rice is to be steamed and thereafter dried, baffle plates 81 are provided, four for instance evenly distributed over the circumference of the drums. These baffle plates 81 are mounted on the inner walls of the drums and extended longitudinally over the whole lengths thereof. The turns of the helical conveyor blades are slotted for receiving within the slots the baffle plates. The space of the drums within the turns of the conveyer blades thus is subdivided, by means of the baffle plates, into compartments. By means of these baffle plates, the kernels of the rice, while being steamed or dried in the slowly revolving drum and moved along the drum by means of the conveyer blade, are alternatingly raised and then dropped from compartment to compartment by the baffle plates during the rotation of the drum.

No baffle plates are provided in drum 11 of Fig. 1, since the rough rice should permanentlly be kept in the hot water during its passage through and along drum 11, and the soaking process.

Figure 4:
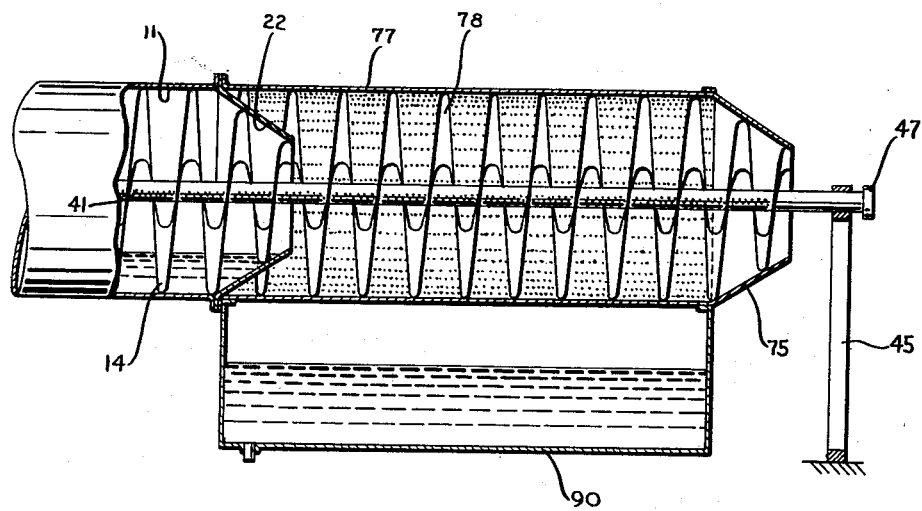

Fig. 4 illustrates a modified form of the discharge end of drum 11 for the soaking of the rough rice.

According to this modification, the discharge end of drum 11 having the conical end piece 22, is provided with an extension piece 77 having a perforated wall and a conical end piece 75. Within the extension piece 77 there is secured to its wall a helical conveyer blade 78 extending into the conical end piece 75. A large receptacle 90 is provided underneath the extension piece 77. The perforated tube 41 extends beyond the discharge end of extension piece 77, and its projecting end is mounted on a support 45. In this modification the soaked rough rice leaves the drum 11 at the end of extension piece 77 free from water, which, through the perforations in extension piece 77 drains off into receptacle 90, such perforations being again in the form of circumferentially directed slots for cooperation with a brush (not shown) contacting the outer surface of the rotating extension piece.

Figure 5:
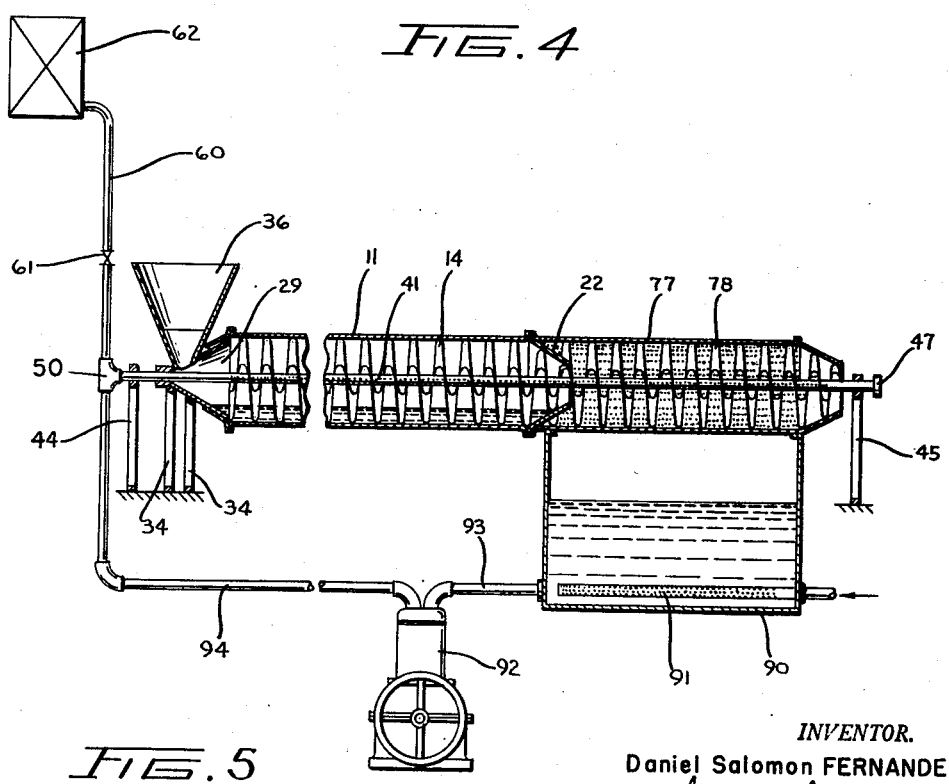
Fig. 5 is a longitudinal, more or less, diagrammatic section of a modification of the apparatus of Figs. 1 and 4.

Another modification of the apparatus of Figs. 1 and 4 illustrated in Fig. 5 shows a perforated or foraminated tube 91 disposed within receptacle 90 which is of sufficient size to remain filled with water. Through tube 91 steam from any source 74 of steam supply is blown into this water to keep it at the desired temperature. Alternatively the receptacle 90 may be fed from a hot water tank. By means of a double-acting suction pump 92 connected to receptacle 90 through a pipe line 93, the hot water within receptacle 90 is supplied through pipe line 94 to the inlet 50 of tube 41 from which, after having served its purpose, it is returned to receptacle 90 through the foraminated extension piece 77. No steam need be blown into tube 41 at 50. Thus the heat present in the waste water is recovered, whilst, owing to the presence of the double-acting pump 92 a greater pressure is available for cleaning the apparatus after use, when so desired. The circulating water may be renewed or replenished from source 62 of water supply.

The successive stages of the processing of rice, as an example, will now be described to illustrate the operation of the apparatus.

Soaking

In the part of the installation, illustrated in Fig. 1, the rice in its natural state, rough rice, is soaked, i. e. partly or fully saturated with water, in the course of which operation the vitamins of the B-complex, chiefly present in the outer cell layers and in the germ, will diffuse towards the center and will thus become uniformly distributed throughout the kernel.

The rough rice to be treated is introduced into the hopper 36 and drops through the cone 29 into the rotating drum 11 wherein it is moved by the helical conveyer blade slowly and in a relatively thin layer uniformly to the discharge end of the drum.

Water is fed through pipe line 60 into the stationary foraminated tube 41 of drum 11, the water being heated to the desired temperature by means of the steam simultaneously admitted through steam pipe 70 or may be heated separately and pumped into the drum through the perforated tube. The quantities of water and of steam and thus the conditions of the soaking process are controlled and regulated by means of the control valves 61 and 72. Thus, in the lower part of drum 11 a layer 85 of hot water collects. When the drum is rotated, the rough rice is continuously moved by the helical conveyer blade 41. The water, continuously fed in slight excess of the quantity taken up by the rice, flows out of the end 86 of cone 22. The soaking bath, likewise moved by the conveyer, thus is in slow, flowing motion. The water flowing out from drum 11 may, if desired, be cleaned and returned to the process.

The accurate control of the soaking process, i. e. the supervision of the temperature of the soaking bath and the degree of saturation of the kernels with water may be effected with the aid of thermometers and control tubes respectively. To this end, the rotating drum may be provided with a plurality of openings, distributed along a generatrix and at intervals of say 1 meter, in which openings, as for instance by means of a bored stopper, a corresponding number of thermometers are secured, which therefore rotate with the drum and in their upper position indicate the temperature of the air in the drum, whilst in their lower position such thermometers show the temperature of the soaking bath. Similarly the degree of saturation of the kernels may be supervised by attaching to the drum a series of glass tubes closed at the top and communicating with the interior of the drum, in such a manner, that in their lower position, such tubes are filled with water and kernels, the transparency of the tubes permitting the operator to observe the colour of the kernels which is a measure of the degree of saturation, as the kernel in taking up water, gradually becomes browner. These means therefore show the product in all its stages during the rotation of the drum.

Alternatively the control tubes may be readily removed from the drum and the water contents of the kernels quickly determined with an electric moist tester or in other manner known per se.

The data thus obtained, determine, whether the speed of rotation of the drum and the water supply should be increased or decreased.

The duration of the soaking process depends upon the kind of rough rice to be treated and the temperature at which the water is kept. It is determined empirically. Suitable temperatures are between 75 and 95° C. The soaked rice leaves the drum continuously at 86.

After use, the drum may be cleaned by closing the steam valve 72 and fully opening the water valve 61, tube 41 then acting as a water sprayer. One or more of the plugs 80 are then removed, so that all waste, leavings and impurities are removed through the opening or openings 79 which should be wide enough, say have a diameter of 10 cm., for example.

Figure 3:
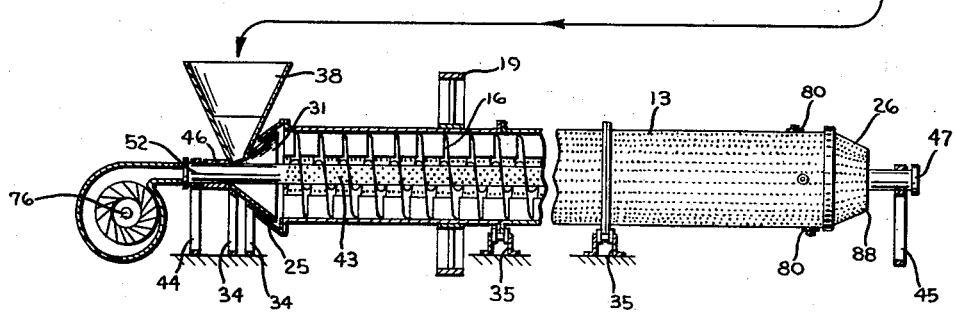
Fig. 3 is a longitudinal, more or less diagrammatic section of the third station, the apparatus for the drying of the kernels after the soaking and steaming.

The soaked rice at its discharge from the drum 11 may be collected in a bin, the water drained off from the rice, or the rice may be conveyed by any appropriate, convenient or conventional means, not shown on the drawings, to the hopper 37 of the steaming station, Fig. 3.

Steaming

The object of the steaming of the partially or fully soaked rough rice, the operation chiefly determining the nature of the product, is the complete gelatinization of the starch in the kernels of the rice, so that the vitamins are retained therein. Through the perfect supervision of the temperature to which the individual kernels are subjected in the apparatus of this invention, such temperature being constantly checked by means of thermometers in the manner described for the soaking of the rough rice, care may now easily be taken that in no part of the rice the desired critical temperature up to which destruction of the vitamins is avoided will be exceeded.

The soaked rice introduced in the revolving drum 12 through hopper 37 and cone 38, is continuously and alternatingly raised and dropped by the baffle plates 81 and simultaneously advanced by the helical conveying blade 12 and finally discharged at the end 87 of cone 24.

Since the perforations of the tube 42 are restricted to the upper portion thereof, direct contact of the steam with the soaked rice is avoided, which would otherwise cause unequal heating of the kernels. Instead thereof the steam is directed to the upper portion of the rotating drum, causing condensation of a portion of the steam. Thus the rice moves through the moist atmosphere, it is true, but in addition to heat, it still takes up a considerable amount of water from the condensate, the supply of heat being thus so regulated, that no condensation water is formed in excess of what the soaked rough rice is still able to take up. The openings 79 of drum 12 might also be used, by removal of the plugs 80, for the continuous discharge of the steamed product. The steam is admitted through conduit 71 and so controlled by means of control valve 73 that no needless loss of steam occurs. If the full vitamin value is to be preserved, the temperature of the soaked rough rice during the steaming process should not be raised above 100° C. By this means the process is also rendered independent of the steam pressure in the boiler.

The steamed rice will at most have a temperature of 95° C. when leaving the apparatus.

The temperature at the steaming may also be controlled through control of the velocity with which drum 11 is revolved. When the drum is revolved more rapidly, the temperature may be reduced, to 80° C. for example and kept at this value. Once the critical temperature for a given type of rough rice is known, the process can be controlled perfectly and accurately, and the conditions under which the treatment is carried out kept constant by means of the control valves 67 and 73 and the velocity of the rotation of drum 11. For controlling the degree of gelatinization of the starch in the kernels, control tubes may be used as in the case of soaking the rough rice.

The steamed rice discharged from drum 12 will then be fed into the hopper 38 of the drying station, Fig. 3.

Drying

The tube 43 provided with round perforations throughout its length is connected at its free end to a fan 76 adapted to supply heated air. This heated air passes through the openings of tube 43 into the rotating drum 13, enters the space between the turns of the helical conveying blade 16, and finally leaves the drum through its wall, which to this purpose is foraminated. The steamed rice fed to the helical conveying blade 16 through hopper 38 and cone 31, is slowly moved in a thin layer through a permanently flowing air current of constant temperature supplied by the fan. The kernels are raised by the baffle plates 81 and then dropped while turning around, are thus dispersed and separated from one another and subjected from all sides to the drying air. The capacity of the fan is so chosen that the water vapor liberated from the kernels will be discharged completely along a short path, viz. along the distance between the layer of the rice and the top of the rotating drum 13.

The dried parboiled rice leaves the apparatus at the discharge end 88 or may be discharged through openings 79.

I claim:

1. An apparatus for steaming grain, particularly for processing, parboiling, rice for preserving and fixing its vitamin contents, said apparatus comprising a cylindrical drum, bearing means for rotatably supporting said drum, means for rotating said drum, a stationary foraminated central tube disposed within said drum and along the longitudinal axis thereof, a helical conveyer blade disposed within said drum and extended the length thereof, said helical blade secured with its outer margin to the inner wall of said drum and with its inner margin ending with clearance off said central tube; said helical blade and said drum adapted, on rotation, to convey said grain in a thin layer within and longitudinally of said drum with the surfaces of the individual grains readily and uniformly accessible to treatment; a feeding device including an end piece in form of a hollow truncated cone mounted at the feeding end of said drum, a stationary hollow cone being provided and disposed so as to extend with its axis horizontally and to engage with its base portion said truncated cone from the inside, a hopper for receiving the grain to be fed into the drum, said hopper being mounted on and opening into the top portion of said horizontally disposed cone at a distance from the axis thereof; said central tube being extended through the top of said horizontally disposed cone; a feed line for water and a feed line for steam, both connected to said central tube at said feed end of said drum and adapted to feed selectively steam, and water admixed with steam to said tube; said drum being open to the atmosphere at its discharge end, said foraminated tube being foraminated only at its upper portion thereby to direct the steam issuing from said foraminated tube towards the portion of the drum which revolves through the upper part of its travel and to cause under said atmospheric conditions condensation of the steam at said portion, and further to allow contact of the grain with the condensate during the lower part of the travel of the drum whilst the grains are revolved and tumbled about and as a whole are conveyed in a thin layer through and along said drum, at a pressure not substantially deviating from atmospheric pressure and at a temperature near to but not exceeding 100° C.; and means for discharging said treated grain at the other end of said drum.

2. An apparatus for drying grain, particularly for drying soaked and steamed rice, of the type which includes a cylindrical drum open to the atmosphere, bearing means for rotatably supporting said drum, means for rotating said drum, a stationary foraminated central tube disposed within said drum and along the longitudinal axis thereof, a helical conveyer blade disposed within said drum and extended the length thereof, said helical blade secured with its outer margin to the inner wall of said drum and with its inner margin ending with clearance off said central tube; said apparatus including a feeding device comprising an endpiece in form of a hollow truncated cone secured to the feeding end of the drum, a stationary hollow cone being provided and disposed so as to extend with its axis horizontally and to engage with its base portion said truncated cone from the inside, a hopper for receiving the grain to be fed into the drum, said hopper being mounted on and opening into the top portion of said horizontally disposed cone at a distance from the axis thereof, said central tube being extended through the top of said horizontally disposed cone; a feed line for supplying drying air connected to said central tube thereby to dry said grain whilst conveying it by means of said helical conveyor blade in a thin layer through said drum; and means for discharging the dried grain at the end of said drum.

3. An apparatus for treating with a fluid medium grain, particularly rice, for preserving its vitamin contents, said apparatus having a cylindrical drum, bearing means and driving means associated with said drum for respectively rotatably supporting and driving said drum, a stationary foraminated central tube disposed within said drum along the longitudinal axis thereof, a feed line connected to said central tube for admitting thereto said fluid medium, a helical conveyer blade disposed within the drum, extended the length thereof and secured with its outer margin to the inner wall of said drum and with its inner margin ending with clearance off said central tube, said conveyer blade and said drum adapted, on rotation, to convey said grain in a thin layer within and longitudinally of said drum with the surfaces of the individual grains readily and uniformly accessible to treatment; said apparatus further including a feeding device comprising an end piece in form of a hollow truncated cone mounted at the feeding end of the drum, a stationary hollow cone being provided and disposed so as to extend with its axis horizontally and to engage with its base portion said truncated cone from the inside, a hopper for receiving the grain to be fed into the drum, said hopper being mounted on and opening into the top portion of said horizontally disposed cone at a distance from the axis thereof, said central tube being extended through the top of said horizontally disposed cone for connecting said central tube to said feed line; thereby feeding into the drum through the top part of said horizontally disposed cone simultaneously said fluid medium and said grain; the discharge end of the drum being open to the atmosphere thereby to treat said grain at atmospheric pressure.

4. An apparatus as set forth in claim 3 for the wet treatment of grain particularly rice for conveying into and diffusing within the kernels of the rice the vitamins contained in the silver-coat, the outer cell layers and the germs of the kernels and fixing them therein by gelatinization of the starch contained in the kernels, wherein said feed line is adapted to be connected with a source of hot water and said central tube has perforations in its lower portion only.

5. An apparatus as set forth in claim 4 wherein said drum is foraminated at its end portion towards the discharge end, said foraminated central tube and said helical conveyer blade being extended also through and along said foraminated end portion of the drum, said helical blade extension being secured with its outer margin to the inner wall of said foraminated end portion of the drum and with its inner margin ending with clearance off said central tube, said foraminated end portion of the drum for draining off water from said grain.

6. An apparatus as set forth in claim 5, wherein a receptacle is associated with said foraminated end portion of the drum, said receptacle adapted and disposed for receiving the water drained off from said drum; said receptacle having associated therewith a foraminated feed line for steam and a discharge line for water; a double acting pump being associated at its suction side with said discharge line for water and at its pressure side with said feed line for water connected to said central foraminated tube, for thus circulating water through said apparatus.

7. An apparatus as set forth in claim 3 for treating grain particularly rice for conveying into and diffusing within the kernels of the rice the vitamins contained in the silver-coat, the outer cell layers and the germs of the kernels and fixing them therein by gelatinization of the starch contained in the kernels, wherein three of said cylindrical drums are provided each open to the atmosphere, said drums being disposed in series for operative connection therebetween; the feed lines of the first and the second of said drums comprising branches adapted for selectively feeding water, steam, and a mixture thereof to said feed lines; thereby, by means of the first of said drums, when in operation and water being supplied thereto through the apertures of the central tube therein, to spray the kernels of the rice and cause them to be permeated with water thereby to start conveying of the vitamins contained in the silver-coat, outer cell layer and germs of the rice into the kernels and diffusion therein and simultaneously to start fixing of the vitamins in the kernels by initiating gelatinization of the starch in the kernels; and by means of the second of said drums and the feed line associated therewith, when in operation, to steam said rice and complete saturation with water and gelatinization at a pressure not substantially deviating from atmospheric pressure and at a temperature near to but not exceeding 100° C.; the third drum of said series having a supply line for air associated therewith and connected to the central tube at the feed end of said third drum, said third drum thus being adapted while conveying therethrough in a thin layer the steamed rice discharged from the second drum and supplied thereto, to dry said rice by means of the air supplied thereto by said central tube.

DANIEL SALOMON FERNANDES.

REFERENCES CITED

The following references are of record in the file of this patent:

UNITED STATES PATENTS

| Number | Name | Date |
|---|---|---|
| 548,115 | Davidson | Oct. 15, 1895 |
| 617,816 | Senior et al. | Jan. 17, 1899 |
| 927,054 | Knecht | July 6, 1909 |
| 1,035,842 | Anderson | Aug. 20, 1912 |
| 2,412,133 | Doyle | Dec. 3, 1946 |

FOREIGN PATENTS

| Number | Country | Date |
|---|---|---|
| 374,712 | Italy | Sept. 6, 1939 |